United States Patent

Yokoyama

[11] Patent Number: 5,714,222
[45] Date of Patent: Feb. 3, 1998

[54] OPTICAL RECORDING MEDIUM AND PROCESS FOR PRODUCING SAME

[75] Inventor: Ryuichi Yokoyama, Yokohama, Japan

[73] Assignee: Canon Kabushiki Kaisha, Tokyo, Japan

[21] Appl. No.: 588,815

[22] Filed: Jan. 19, 1996

[30] Foreign Application Priority Data

Jan. 23, 1995 [JP] Japan ................... 7-008010

[51] Int. Cl.$^6$ ................................ B32B 3/00
[52] U.S. Cl. ............ 428/64.1; 428/64.2; 428/64.3; 428/64.4; 428/64.7; 428/913; 430/270.11; 430/495.1; 430/945; 369/283; 369/288; 427/372.2; 427/385.5
[58] Field of Search .................. 428/64.1, 64.2, 428/64.4, 64.3, 64.7, 913; 430/270.1, 270.11, 495.1, 945; 369/283, 288; 427/372.2, 385.5

[56] References Cited

U.S. PATENT DOCUMENTS

| | | | |
|---|---|---|---|
| 4,584,259 | 4/1986 | Mayer et al. | 430/273 |
| 4,981,743 | 1/1991 | Ho | 428/64 |
| 4,983,505 | 1/1991 | Higuchi et al. | 430/495 |
| 5,085,910 | 2/1992 | Matsushima et al. | 428/64 |
| 5,204,153 | 4/1993 | Matsui et al. | 428/64 |
| 5,313,452 | 5/1994 | Usami et al. | 369/275 |
| 5,316,814 | 5/1994 | Sawada et al. | 428/64 |
| 5,382,460 | 1/1995 | Onagi et al. | 428/64 |

FOREIGN PATENT DOCUMENTS

| | | |
|---|---|---|
| 57-060542 | 4/1982 | Japan . |
| 59-206077 | 11/1984 | Japan . |
| 4-125873 | 4/1992 | Japan . |
| 6176401 | 6/1994 | Japan . |

OTHER PUBLICATIONS

European Search Report dated Jul. 19, 1996.

*Primary Examiner*—Patrick Ryan
*Assistant Examiner*—Elizabeth Evans
*Attorney, Agent, or Firm*—Fitzpatrick, Cella, Harper & Scinto

[57] ABSTRACT

The optical recording medium has an optically transparent substrate having a center hole, a recording layer formed on the substrate, and a protective layer. The protective layer has an opening whose center coincides with a center of the center hole of the substrate, and the opening of the protective layer is larger than the center hole of the substrate. The optical recording medium is produced by a process including the steps of forming the protective layer for covering the recording layer so that the protective layer has an opening whose center coincides with a center of the center hole, and forming the opening of the protective layer so that it is larger than the center hole of the substrate. The step of forming the protective layer may be achieved using a spin coating method.

22 Claims, 1 Drawing Sheet

OPTICAL RECORDING MEDIUM AND PROCESS FOR PRODUCING SAME

BACKGROUND OF THE INVENTION

1. Field of the Invention

The present invention relates to an optical recording medium, and a process for producing such a medium, upon which at least one of recording, reproducing and erasing of information is optically performed.

2. Related Background Art

Recently, rewritable optical disks have been marketed and increasingly have been used as files for code data and images in computers. However, in such disks, recording, reproducing or erasing is conducted by using a laser beam. Thus, errors sometimes occur in reading or recording data if dust particles or flaws are present on a laser beam incident surface of a substrate of the disk. For example, in a magnetooptical disk, and particularly in a magnetooptical disk in a magnetic field modulation recording system which employs a magnetic head, either the recording medium or the device may be broken due to electrostatic contact between the magnetic disk and a protective layer, which may be caused by dust particles on the protective layer or by operation in an atmosphere at low humidity. Therefore, investigation has been made as to the possibility of providing a protective layer containing an antistatic agent and a lubricant on each of the laser beam incident surface and the recording layer of a substrate, for preventing adhesion of dust particles and flaws. On the other hand, it has been known that the addition of an antistatic agent and a lubricant to the protective layer causes corrosion and blister formation in the recording layer. Thus, investigation has also been made as to the possibility of providing a two-layer structure comprising a first protective layer containing no additive and a second protective layer containing an antistatic agent, etc., and a multi-layer protective layer comprising a first protective layer, a second protective layer and an intermediate protective layer for improving adhesion between the first and second protective layers, and correcting warping of a substrate (Japanese Patent Application No. 4-125873).

Examples of known methods of producing an optical recording medium comprising such a multi-layer protective layer include a method of successively laminating photocurable resin layers and a method of successively laminating resin sheets.

A possible method of forming, with good productivity, a multi-layer protective layer comprising laminated photocured resin layers on a disk substrate is a method comprising coating a photo-curable resin composition for forming a first protective layer by a spin coating method, curing the resin composition to form the first protective layer, coating a photo-curable resin composition for forming a second protective layer by the spin coating method and then curing the resin composition to form the second protective layer.

However, stripe marks caused by a flow of an uncured photo-curable resin composition are sometimes observed on the surface of the multi-layer protective layer formed by this method. This causes the formation of a disk comprising a protective layer having a nonuniform thickness. Such a disk comprising a protective layer having a nonuniform thickness becomes an inferior product because of its poor appearance, and consequently decreases productivity.

When a magnetooptical recording medium, and particularly a magnetooptical recording medium for recording data thereon in a magnetic field modulation system, is produced by the above-described process, the magnetic head may be broken due to collision between the magnetic head and the protective layer having a nonuniform thickness, or recorded data is lost due to breakage of the magnetooptical recording medium.

SUMMARY OF THE INVENTION

The present invention has been achieved in consideration of the above problems, and an object of the present invention is to provide an optical recording medium having an excellent appearance even when a multi-layer protective layer is formed by a spin coating method.

Another object of the present invention is to provide an optical recording medium which minimizes or eliminates produces recording errors.

Another object of the present invention is to provide a process for producing, with good productivity, an optical recording medium comprising a multi-layer protective layer, which minimizes or eliminates inferior products.

According to an aspect of the present invention, there is provided an optical recording medium comprising an optically transparent substrate having an opening, a recording layer and a protective layer, both of which are formed on the substrate, wherein the protective layer has an opening whose center coincides with the opening of the substrate and which is larger than the opening of the substrate.

According to another aspect of the present invention, there is provided a process for producing an optical recording medium comprising an optically transparent substrate having an opening, a recording layer and a protective layer, both of which are formed on the substrate comprising forming the protective layer on the substrate so as to coat the recording layer, and providing an opening in the protective layers whose center coincides with the opening of the substrate and which is larger than the opening of the substrate.

According to another aspect, the present invention relates to a method for manufacturing an optical recording medium comprising the steps of providing an optically transparent disk-shaped substrate having an opening defined by an opening periphery located at a central portion thereof, forming a recording layer on the substrate, and forming a protective layer on at least a portion of the substrate and the recording layer by depositing an annular ring of photocurable resin material on the substrate, around the opening periphery of the opening in the substrate, spin-coating the annular ring of photocurable resin material over at least a portion of the substrate and the recording layer, and photocuring the photocurable resin material.

DETAILED DESCRIPTION OF THE PREFERRED EMBODIMENTS OF THE PRESENT INVENTION

Embodiments of the present invention are described below with reference to the drawings.

Figure 1:
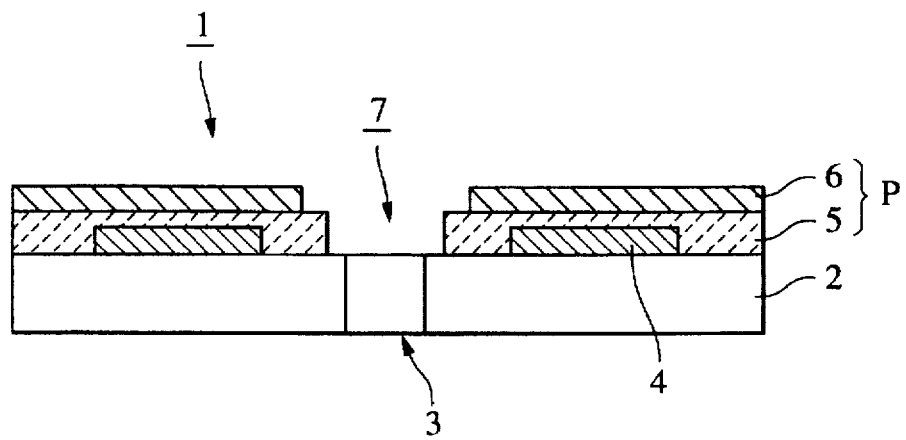
FIG. 1 is a schematic sectional view of an optical disk in accordance with an embodiment of the present invention.

In FIG. 1, reference numeral 1 denotes a magnetooptical disk; reference numeral 2 denotes a substrate having a center hole 3; reference numeral 4 denotes a magnetooptical recording layer; and reference numeral 5 denotes a multi-layer protective layer P comprising a first protective layer 5 and a second protective layer 6.

The first and second protective layers are formed in an annular form on the substrate 2 so that the diameter of an opening of the second protective layer 6 is greater than the diameter of an opening of the first protective layer 5.

Figure 2:
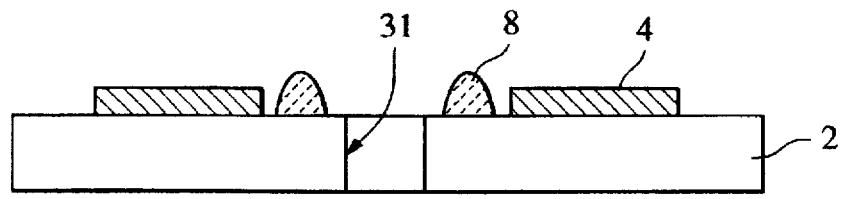
FIG. 2 is a schematic drawing illustrating a process for producing the optical disk shown in FIG. 1 in accordance with another embodiment of the present invention.

On the magnetooptical disk, as shown in FIG. 2, a photo-curable resin composition 8 is provided in an annular form on the substrate 2 having the recording layer 4 formed thereon, in the vicinity of the center hole 3, and the photo-curable resin composition 8 is then spread by rotating the substrate 2 to coat the recording layer 4 with the resin composition 8. Thereafter, the photo-curable resin composition is cured by irradiation with light to form the first protective layer 5. It is preferable that the diameter of an opening 7 of the first protective layer 5 is larger than the diameter of the center hole 3 of the substrate 2.

Specifically, to obtain an optical recording medium having an excellent appearance and causing minimum or no recording errors, it is preferable that the photo-curable resin composition for forming the first protective layer 5 is applied or deposited as an annular ring in the vicinity of the center hole 3 of the substrate 2, and then spin-coated so as not to drop into the center hole 3 of the substrate 2 on side wall 31.

Namely, in a spin coating technique, the rotational speed is generally increased during the final stage of the coating step, before the coating step is completed.

For example, even if the resin material drops into the center hole 3 on the side wall 31, as described above, then resin material located on the side wall 31 of the center hole 3 may be returned to the surface of the first protective layer and radially spread out on the surface thereof by centrifugal force, when the rotational speed is increased at the end of the spin-coating process to make the surface of the resin composition for first protective layer flat and smooth. As a result, resin marks may remain on the surface of the first protective layer 5 and thus deteriorate not only the appearance of the surface of the first protective layer 5 but also the smoothness of the first protective layer 5, thereby causing head crash.

In order to prevent the photo-curable resin composition for forming the first protective layer 5 from dropping into the center hole 3 on the side wall 31 of the substrate 2 during the step of applying the resin composition in the vicinity of the center hole 3 of the substrate 2 and the subsequent spin coating step, it is effective to control the angle of contact between the resin composition and the substrate, the position of deposition of the resin composition, etc. For example, it is preferable to appropriately set the above coating conditions so as to prevent the resin composition from sufficiently spreading during the time the resin composition is supplied to a portion in the vicinity of the center hole of the substrate.

Figure 3:
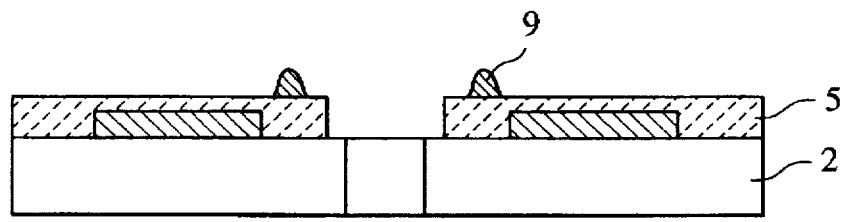
FIG. 3 is a schematic drawing illustrating a process for producing the optical disk shown in FIG. 1 in accordance with a further embodiment of the present invention.

Referring now to FIG. 3, like the first protective layer 6, the second protective layer on the first protective layer 5 is formed by depositing an annular ring of a photo-curable resin composition 9 for forming the second protective layer 6, spreading the resin composition 9 by rotating the substrate 2 and then curing the resin composition by irradiation with light.

The diameter of an opening of the second protective layer 6 is preferably greater than that of the opening of the first protective layer 5. Namely, in order to prevent the photo-curable resin composition for forming the second protective layer from dropping into the opening on side wall 31 of the center hole 3 of the substrate 2 during the step of depositing the resin composition in the vicinity of the center hole 3 of the substrate 2 and the subsequent spin coating step, it is effective to control the angle of contact between the resin composition for forming the second protective layer and the substrate, the position of deposition of the resin composition, etc. For example, it is preferable to appropriately set the above coating conditions so as to prevent the resin composition from sufficiently spreading during the time the resin composition is supplied to a portion in the vicinity of the center hole of the substrate.

Although this embodiment relates to an optical recording medium having a multi-layer protective layer comprising two protective layers, the technology of the present invention is also useful for an optical recording medium having a multi-layer protective layer comprising three or more protective layers. Specifically, an optical recording medium having a multi-layer protective layer can be produced by using the spin coating method in which the diameter of an opening of a (n+1)th protective layer (n is an integer of 1 or more) in the multi-layer protective layer from the side of the recording layer is greater than the diameter of an opening of a (n)th protective layer.

In the embodiment of the present invention, the photo-curable resin compositions for the multi-layer protective layer are not limited as long as they have no adverse effect on the recording layer and satisfy the above-described characteristics. For example, acrylic ultraviolet curing resins and the like can be used. An example of such resins is a composition comprising prepolymer component (A), monomer component (B) serving as a reactive diluent, and photopolymerization initiator component (C) at a ratio of components (A), (B) and (C) in which the ratio of component (A) : component (B)=5 to 95: 95 to 5 (ratio by weight), and the concentration of component (C) is 0.1 to 10% by weight of the total amount.

Examples of component (A) include polyol polyacrylates (polyhydric alcohol or polyether polyacrylates), particularly, at least trifunctional polyol polyacrylates, such as pentaerythritol triacrylate, dipentaerythritol hexaacrylate, and the like; modified polyol polyacrylates (polyacrylates of polyols modified by epoxide or lactone or diacrylates of modified diols obtained by adding epoxide to polyhydroxy phenols such as hisphenol A or bisphenol S); polyester acrylates (produced by condensation telomerization of polyhydroxy alcohols, polybasic acids or anhydrides thereof and acrylic acid); urethane acrylates (produced by reaction of polyols such as polyether polyols or polyester polyols, polyisocyanate and acrylates having a hydroxyl group); epoxy acrylates (oligomers obtained by adding acrylic acid or acrylates having a terminal carboxyl group to epoxy compounds); bisphenol A diglycidyl ethers; novolak polyglycidyl ethers and the like. Particularly, at least trifunctional polyol polyacrylates having excellent curing properties and high surface hardness are preferable.

Examples of component (B) include acrylates of polyhydroxy alcohols, particularly, polyfunctional acrylic monomers, for example acrylates such as ethylene glycol diacrylate, diethylene glycol diacrylate, triethylene glycol diacrylate, polyethylene glycol diacrylate, butylene glycol diacrylate, neopentyl glycol diacrylate, 1,4-butanediol diacrylate, 1,4-hexanediol diacrylate, pentaerythritol diacrylate and the like; triacrylates such as pentaerythritol triacrylate, trimethylolpropane triacrylate and the like. Any one of these compounds or a mixture comprising at least two of these compounds can be used as component (B).

Although any known photopolymerization initiators can be used as component (C), initiators exhibiting good storage stability after mixing are preferable. Examples of such initiators include benzoin alkyl ether types such as benzoin ethyl ether, benzoin isobutyl ether and the like; acetophenone types such as 2,2'-diethoxyacetophenone, 4'-phenoxy-2,2-dichloroacetophenone, and the like; propiophenone types such as 2-hydroxy-2-methylpropiophenone, 4'-isopropyl-2-hydroxy-2-methylpropionphenone and the like; anthraquinone types such as benzyl methyl ketal, 1-hydroxycyclohexyl phenyl ketone, 2-ethyl anthraquinone and 2-chloroanthraquinone and the like; thioxanthone types such as 2,4-dimethyl thioxanthone, Michler's ketone and the like. Any one of these compounds or a mixture of at least two compounds at any desired ratio can be used.

A recording layer which is generally used for optical recording, such as a recording layer containing an organic dye, e.g., a polymethine dye or cyanine dye, a magnetooptical recording layer containing a rare earth metal or transition metal, can be used as the recording layer.

When a light beam for at least one of recording, reproduction and erasing information is applied to the optical recording medium through the substrate, the substrate is preferably transparent to the light beam. Preferable examples of such substrates include substrates comprising bisphenol A type polycarbonate, acrylic resin, methacrylic resin, polystyrene resin, polyolefin resin and the like.

As described above, when the multi-layer protective layer is formed, the (n+1)th protective layer is formed so as to have an opening larger than the opening of the (n)th protective layer, thereby preventing the occurrence of nonuniformity of the thickness due to stripe marks.

In addition, the angle of contact between the curable resin for the second protective layer and the first protective layer is larger than the angle of contact between the curable resin for the first protective layer and the substrate, thereby facilitating control of the coating positions of the curable resins and the thicknesses of the layers, and thus improving productivity.

Further, the angle of contact between the curable resin for the (n+2)th protective layer and the (n+1)th protective layer (n is an integer of 1 or more) is larger than the angle of contact between the curable resin for the (n+1)th protective layer and the (n)th protective layer, thereby facilitating control of the resin coating positions and the thicknesses of the layers, and thus improving productivity.

A number of embodiments of the present invention will now be explained in more detail with reference to the following examples.

EXAMPLE 1

Figure 4:
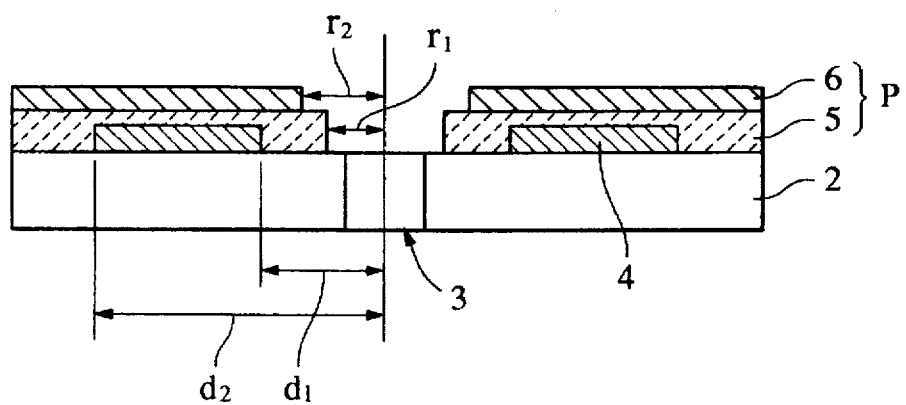
FIG. 4 is a schematic drawing illustrating a first embodiment of the present invention.

As shown in FIG. 4, on a polycarbonate disk substrate 2 having a diameter of 86 mm (with an opening 3 having a diameter of 15 mm) an annular magnetooptical recording layer 4 was formed, by a sputtering method, so as to be concentric with the disk substrate 2. The recording layer 4 comprised an inorganic protective layer, a magnetic layer, an inorganic protective layer and a reflecting layer, the radii (d1) and (d2) of small and large circles of the annular recording layer 4 being 20 mm and 42.5 mm, respectively.

An epoxyacrylate ultraviolet curable resin (Trade Name: MH-7210; produced by Mitsubishi Rayon Co., Ltd.) having a surface tension of about 29 mN/m at 23° C. was circumferentially supplied in an annular form whose center coincided with the center hole 3 of the substrate 2 and which had a radius of 16.5 mm, as shown in FIG. 2. The curing resin was then coated in a thickness of about 6 μm by a spin coating method on a doughnut-like annular region concentric with the center hole 3 and surrounded by circles having a radii of 16 mm and 43 mm to cover the recording layer 4. The curing resin was then irradiated with ultraviolet light to form a first protective layer 5. An ultraviolet curing epoxyacrylate resin (Trade Name: EX-841; produced by Dainippon Ink Co., Ltd.) having a surface tension of about 37 mN/m at 23° C. was supplied in an annular form whose center coincided with the center hole 3 of the substrate 2 and which had a radius of 16.5 mm, on the first protective layer, and was then spin-coated to form a second protective layer 4 of about 4 μm thickness In this way, a magnetooptical disk with a multi-layer protective layer P was formed.

As a result, the radius $r_1$ of the opening of the first protective layer 5 formed by curing was about 16 mm, and the radius $r_2$ of the opening of the second protective layer 6 was 16.2 mm. The angle of contact between the material for the first protective layer 5 and the substrate 2 was about 30°, and the angle of contact between the material for the second protective layer 6 and the first protective layer 5 was about 60°. In this example, materials having different surface tensions were used in order to cause the different contact angles. Namely, a material having a surface tension lower than that of the material for the second protective layer 6 was used for the first protective layer 5 so that the angle of contact between the material for the first protective layer 5 and the substrate 2 was smaller than the angle of contact between the material for the second protective layer 6 and the first protective layer 5. This increased the contact angle of the material for the upper second protective layer 6 and thus facilitated control of the coating positions and of the thicknesses of the layers, thereby improving productivity.

EXAMPLE 2

A magnetooptical disk was produced in the same manner as in Example 1 except that an ultraviolet curable epoxyacrylate resin (Trade Name: EX-841; produced by Dainippon Ink Co., Ltd.) having a surface tension of about 37 mN/m was used as a material for the first protective layer 5 under heating at about 40° C., and the same ultraviolet curable epoxyacrylate resin as the resin used for the first protective layer 5 was used as the material for the second protective layer 6 under cooling at about 15° C.

As a result, the radius $r_1$ of the opening of the first protective layer 5 formed by curing was about 16 mm, and the radius $r_2$ of the opening of the second protective layer 6 was 16.3 mm. The angle of contact between the material for the first protective layer 5 and the substrate 2 was about 30°, and the angle of contact between the material for the second protective layer 6 and the first protective layer 5 was about 63°. In this example, the respective resin materials were coated at different temperatures in order to cause different contact angles. Namely, the coating temperature of the material for the first protective layer 5 was relatively high, and the coating temperature of the material for the second protective layer 6 was relatively low so that the angle of contact between the material for the first protective layer 5 and the substrate 2 was smaller than the angle of contact between the material for the second protective layer 6 and the first protective layer 5. In this way, since the contact angle of the material used can be changed by temperature control, various materials can be used without being restricted by surface tension and viscosity.

EXAMPLE 3

A magnetooptical disk was produced in the same manner as that in Example 1, except that the material for the second protective layer 6 was circumferentially supplied in an annular form which was concentric with the center hole 3 of the substrate 2 and which had a radius of 17.5 mm. As a result, the radius ($r_2$) of the opening of the second protective layer 6 was 17.2 mm.

EXAMPLE 4

A magnetooptical disk was produced in the same manner as that in Example 2, except that the material for the second protective layer 6 was circumferentially supplied in an annular form which was concentric with the center hole 3 of the substrate 2 and which had a radius of 17.5 mm. As a result, the radius ($r_2$) of the opening of the second protective layer 6 was 17.3 mm.

EXAMPLE 5

A recording layer 4 was formed on a polycarbonate substrate 2 in the same manner as that in Example 1. An ultraviolet curable urethane acrylate resin (Trade Name:SD-301; produced by Dainippon Ink Co., Ltd.) having a surface tension of about 40 mN/m at 23° C. was circumferentially supplied in an annular form which was concentric with the center hole 3 of the substrate 2 and which had a radius of 16.5 mm. The curing resin was then coated, by a spin coating method, on a doughnut-like annular region surrounded by a circle which was concentric with the center hole 3 and which had a radius of 43 mm and a circle which was concentric with the center hole 3 and which had a radius of 16 mm, to form a resin layer having a thickness of 6 µm for coating the recording layer 4. The resin layer was then cured by irradiation with ultraviolet light to form the first protective layer 5.

An ultraviolet curable epoxyacrylate resin (Trade Name: MH-7210; produced by Mitsubishi Rayon Co., Ltd.) having a surface tension of about 26 mN/m at 23° C. and containing an antistatic agent was circumferentially supplied in an annular form which was concentric with the center hole 3 and which had a radius of 19.5 mm, on the first protective layer 5. The resin was coated to a thickness of about 4 µm on the first protective layer 5 by a spin coating method, and then irradiated with ultraviolet light to form the second protective layer 6. In this way, a magnetooptical disk was obtained.

As a result, the radius $r_1$ of the opening of the first protective layer 5 was about 16 mm, and the radius $r_2$ of the opening of the second protective layer 6 was about 17.5 mm. The angle of contact between the material for the first protective layer 5 and the substrate 2 was about 60°, and the angle of contact between the material for the second protective layer 6 and the first protective layer 5 was about 30°. However, since the radii of the small circles of the annular forms were different in coating the respective resins, the magnetooptical disk obtained in this example caused no streak having a nonuniform thickness or visually recognizable on the surface of the second protective layer 6, thereby increasing the yield of the magnetooptical disk.

COMPARATIVE EXAMPLE 1

A magnetooptical disk was produced in the same manner as that in Example 5, except that the photo-curable resin composition for the second protective layer 6 was circumferentially supplied in an annular form which was concentric with the center hole 3 and which had a radius of 16.5 mm, on the first protective layer 5.

As a result, stripes radially extending from the opening of the second protective layer 6 were observable with the eye on the second protective layer 6, and the thickness of a portion of the second protective layer 6 where the stripes were observed was greater than a predetermined thickness of 4 µm. The magnetooptical disk of this example was thus unsuitable as a magnetooptical disk, particularly as a magnetooptical disk in a magnetic field modulation recording system.

EXAMPLE 6

100 magnetooptical disks were produced in the same manner as in EXAMPLE 1, and the percentage of magnetooptical disks free from a conspicuous streak on the second protective layer 6 was measured.

The results are shown in Table 1.

EXAMPLE 7

100 magnetooptical disks were produced in the same manner as in EXAMPLE 2.

EXAMPLE 8

100 magnetooptical disks were produced in the same manner as in EXAMPLE 3.

EXAMPLE 9

100 magnetooptical disks were produced in the same manner as in EXAMPLE 4.

EXAMPLE 10

100 magnetooptical disks were produced in the same manner as in EXAMPLE 5.

COMPARATIVE EXAMPLE 2

100 magnetooptical disks were produced in the same manner as in COMPARATIVE EXAMPLE 1.

The magnetooptical disks produced in each of EXAMPLEs 7, 8, 9 and 10 and COMPARATIVE EXAMPLE 2 were evaluated in the same manner as in EXAMPLE 6.

The results are shown in Table 1.

TABLE 1

| | Number of disks with streak defect | Number of good disks | Yield |
| --- | --- | --- | --- |
| EXAMPLE 6 | 3 | 97 | 97% |
| EXAMPLE 7 | 3 | 97 | 97% |
| EXAMPLE 8 | 0 | 100 | 100% |
| EXAMPLE 10 | 4 | 96 | 96% |
| COMPARATIVE EXAMPLE 2 | 40 | 60 | 60% |

Thus, those skilled in the art readily will appreciate that the preferred embodiments achieve each of the above-listed objects of the inventions.

While the present invention has been described with respect to what is presently considered to be the preferred embodiments, it is to be understood that the invention is not limited to the disclosed embodiments. To the contrary, the present invention includes various modifications and equivalent arrangements included within the spirit and scope of the appended claims. The scope of the following claims is to be accorded the broadest interpretation so as to encompass all such modifications and equivalent structures and functions.

What is claimed is:

1. An optical recording medium comprising:
   an optically transparent substrate having an opening defined by an opening perimeter;
   a recording layer formed on the substrate; and
   a multilayer protective layer comprised of a plurality of protective layers successively formed on at least a portion of said substrate and said recording layer, wherein each of said plurality of protective layers has an opening defined by a respective opening perimeter, each of said openings of said plurality of protective layers being larger than the opening of the substrate, such that the opening perimeter of the opening in said substrate is located within the opening perimeter the opening in each of said plurality of protective layers, and wherein a diameter of an opening of an (n+1)th protective layer in the multilayer protection layer is larger than a diameter of an opening of an (n)th protective layer, wherein "n" is an integer not less than 1.

2. An optical recording medium according to claim 1, wherein said substrate is disk-shaped.

3. An optical recording medium according to claim 2, wherein a center of the opening of said protective layer coincides with a center of the opening of said substrate.

4. An optical recording medium according to claim 3, wherein each of the opening of said substrate and the opening of said protective layer has a round shape.

5. An optical recording medium according to claim 2, wherein each of the opening of said substrate and the opening of said protective layer has a found shape.

6. An optical recording medium according to claim 1, wherein a center of the opening of said protective layer coincides with a center of the opening of said substrate.

7. An optical recording medium according to claim 6, wherein each of the opening of said substrate and the opening of said protective layer has a round shape.

8. An optical recording medium according to claim 1, wherein each of the opening of said substrate and the opening of said protective layer has a round shape.

9. An optical recording medium according to claim 1, wherein the protective layer comprises a photo-cured resin composition.

10. An optical recording medium according to claim 1, wherein each of the plurality of protective layers in the multilayer protective layer comprises a photo-cured resin.

11. An optical recording medium according to claim 1, wherein said multilayer protective layer comprises a first protective layer formed on at least a portion of said substrate, and a second protective layer formed on said first protective layer, said first protective layer comprising a photo-cured resin composition, the resin composition before being cured having a first contact angle with said substrate when disposed on said substrate, and said second protective layer comprising a photo-cured resin composition, the resin composition before being cured having a second contact angle with said first protective layer when disposed on said first protective layer, said first contact angle being smaller than said second contact angle.

12. An optical recording medium according to claim 1, wherein the (n+1)th layer in the multilayer protective layer comprises a photo-cured resin composition, the resin composition before being cured having a first contact angle with the (n) th layer when disposed on the (n) th layer, and wherein an (n+2)th protective layer comprises a photo-cured resin composition, said resin composition before being cured having a second contact angle with the (n+1)th protective layer, said first contact angle being smaller than said second contact angle.

13. An optical recording medium according to claim 1, wherein the multilayer protective layer comprises a first protective layer provided on the recording layer and a second protective layer provided on the first protective layer, the first protective layer containing no additives, and the second protective layer containing an antistatic agent or lubricant.

14. A process for producing an optical recording medium comprising the steps of:
   providing an optically transparent substrate having an opening;
   forming a recording layer on the substrate; and
   forming a multilayer protective layer comprising a plurality of successively formed protective layers on at least a portion of the substrate and the recording layer, each of said plurality of protective layers having a respective opening having a center that coincides with a center of the opening of the substrate, each of said respective openings being larger than the opening of the substrate, and wherein an opening of an (n+1)th protective layer in the multilayer protective layers is larger than a diameter of an opening of an (n)th protective layer, where "n" is an integer not less than 1.

15. A process for producing an optical recording medium according to claim 14, wherein each of the opening of the substrate and the opening of the protective layer has a round shape.

16. A process for producing an optical recording medium according to claim 14, wherein each of the successively formed protective layers of said multilayer protective layer comprises a photo-cured resin.

17. A process for producing an optical recording medium according to claim 14, wherein the step of forming a plurality of successively formed protective layers includes;
   forming a first protective layer comprising a photo-cured resin composition, the resin composition before being cured having a first contact angle with the substrate when disposed on the substrate, and
   forming a second protective layer comprising a photo-cured resin composition, the resin composition before being cured having a second contact angle with the first protective layer when disposed on the first protective layer, the first contact angle being smaller than the second contact angle.

18. A process producing an optical recording medium according to claim 14, wherein the step of forming a plurality of successively formed protective layers includes;
   forming an (n+1)th protective layer comprising a photo-cured resin composition, the resin composition before being cured having a first contact angle with an (n)th protective layer when disposed on the (n) th protective layer, and
   forming an (n+2)th protective layer comprising a photo-cured resin composition, the resin composition before being cured having a second contact angle with the (n+1)th protective layer when disposed on the (n+1)th protective layer, the first contact angle being smaller than the second contact angle.

19. A process for manufacturing an optical recording medium according to claim 18, wherein the step of forming a plurality of successively formed protective layers includes:
   forming a first protective layer comprising a photo-cured resin composition on the substrate directly, the resin composition before being cured having a third contact angle with the substrate when disposed on the substrate, and forming a second protective layer comprising a photo-cured resin composition, the resin composition before being cured having a forth contact angle with the first protective layer when disposed on the first protective layer, the third contact angle being smaller than the forth contact angle.

20. A method for manufacturing an optical recording medium comprising the steps of:

providing an optically transparent disk-shaped substrate having an opening defined by an opening periphery located at a central portion thereof;

forming a recording layer on the substrate;

successively forming a plurality of protective layers on at least a portion of the substrate and the recording layer, wherein each of the plurality of protective layers is formed by depositing an annular ring of photocurable resin material on the substrate, around the opening periphery of the opening in the substrate, or on a preceding protective layer around an opening periphery of a respective openings in the preceding protective layer;

spin-coating the annular ring of photocurable resin material over at least a portion of the substrate and the recording layer, and photo-curing the photocurable resin material; and wherein positions where respective annular rings of photocurable resin material are disposed and selected such that each of the openings of the protective layer is larger than the opening of the substrate and the opening of the respective preceding protective layer.

21. A method for manufacturing an optical recording medium according to claim 20, wherein said forming step includes controlling a coating temperature of the respective photocurable resin materials.

22. A method for manufacturing an optical recording medium according to claim 20, wherein said forming step includes controlling a surface tension or viscosity of the respective photocurable resin materials.

* * * * *

UNITED STATES PATENT AND TRADEMARK OFFICE
CERTIFICATE OF CORRECTION

PATENT NO. : 5,714,222
DATED : February 3, 1998
INVENTOR(S) : RYUICHI YOKOYAMA

It is certified that error appears in the above-identified patent and that said Letters Patent is hereby corrected as shown below:

<u>Column 4</u>

Line 45, "hisphenol A" should read --bisphenol A--.

<u>Column 6</u>

Line 4, "a" should be deleted.

<u>Column 9</u>

Line 14, "perimeter" should read --perimeter of--.
Line 31, "found" should read --round--.

<u>Column 11</u>

Line 5, "forth" should read --fourth--.
Line 8, "forth" should read --fourth--.

Signed and Sealed this

Fourth Day of August, 1998

Attest:

BRUCE LEHMAN

*Attesting Officer*     *Commissioner of Patents and Trademarks*